United States Patent [19]

Koyanagi et al.

[11] Patent Number: 5,303,979
[45] Date of Patent: Apr. 19, 1994

[54] APPARATUS FOR ADJUSTING FASTENING POSITION OF FASTENING MEANS IN SEAT BELT DEVICE

[75] Inventors: Toshiro Koyanagi; Yayoi Hashimoto, both of Hikone; Haruyuki Takagi, Tokyo, all of Japan

[73] Assignee: Takata Corporation, Tokyo, Japan

[21] Appl. No.: 981,412

[22] Filed: Nov. 25, 1992

[30] Foreign Application Priority Data

Dec. 5, 1991 [JP] Japan .................................. 3-322099

[51] Int. Cl.5 ............................................. A47D 15/00
[52] U.S. Cl. ................................... 297/250.1; 297/487
[58] Field of Search ............... 297/251, 252, 253, 254, 297/216, 244, 485, 487, 486

[56] References Cited

U.S. PATENT DOCUMENTS

| | | | |
|---|---|---|---|
| 3,563,600 | 2/1971 | Converse | 297/254 |
| 4,858,997 | 8/1989 | Shubin | 297/487 |
| 5,061,012 | 10/1991 | Parker et al. | 297/487 X |
| 5,228,746 | 7/1993 | Burleigh | 297/485 X |

*Primary Examiner*—Richard E. Moore
*Attorney, Agent, or Firm*—Armstrong, Westerman, Hattori, McLeland & Naughton

[57] ABSTRACT

In an infant-restraining protective seat, a cover seat (98) is tiltably supported on a turning shaft (20) which tiltably supports a seat back (3) on a seat portion (2). When the cover seat (98) is at a position at which it closes a second recess of a seat-portion body (7), the cover seat (98) forms a seat surface on the upper side of the seat-portion body (7). When the cover seat (98) is at a position at which it opens the second recess (14), the operation for fastening and unfastening a tongue (123) and buckle (124) of a seat belt device installed in a vehicle seat, which operation is performed in the second recess (14), can be performed with ease from above the front of the protective seat (1).

4 Claims, 13 Drawing Sheets

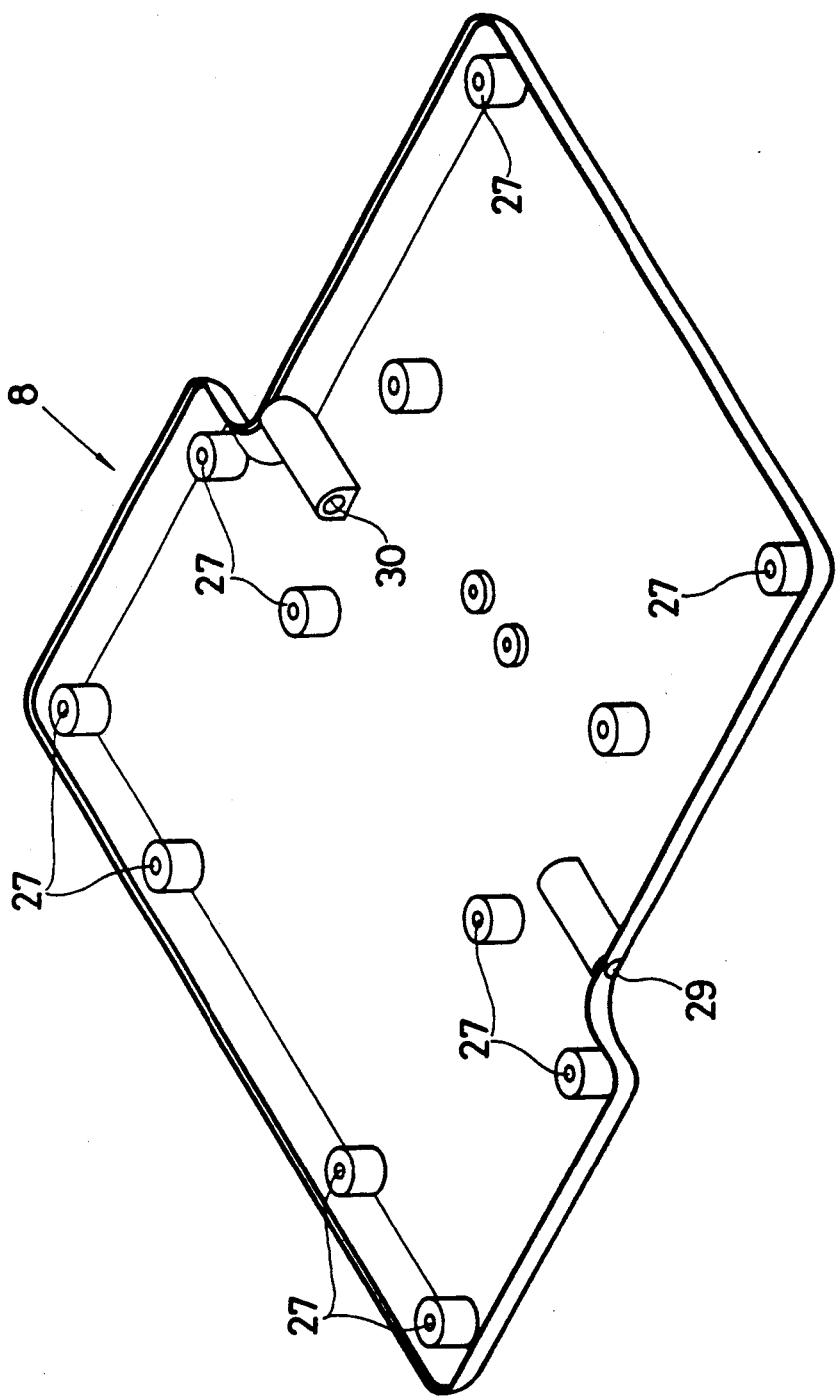

Fig. 13(a)
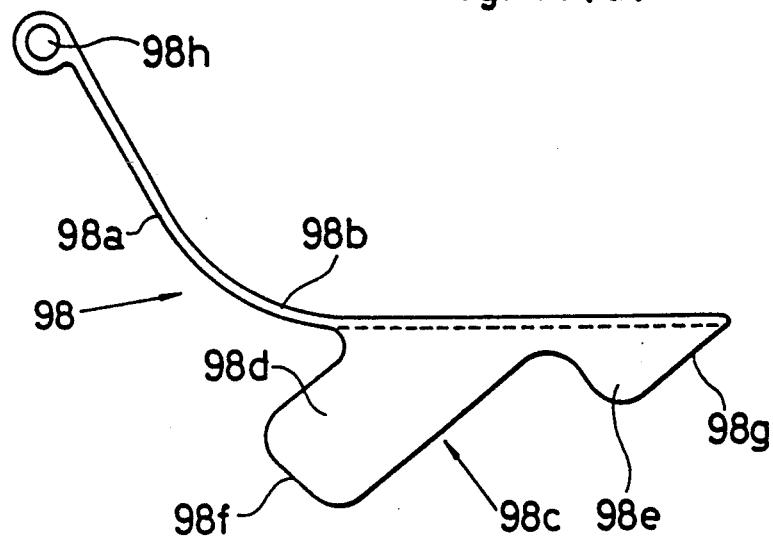
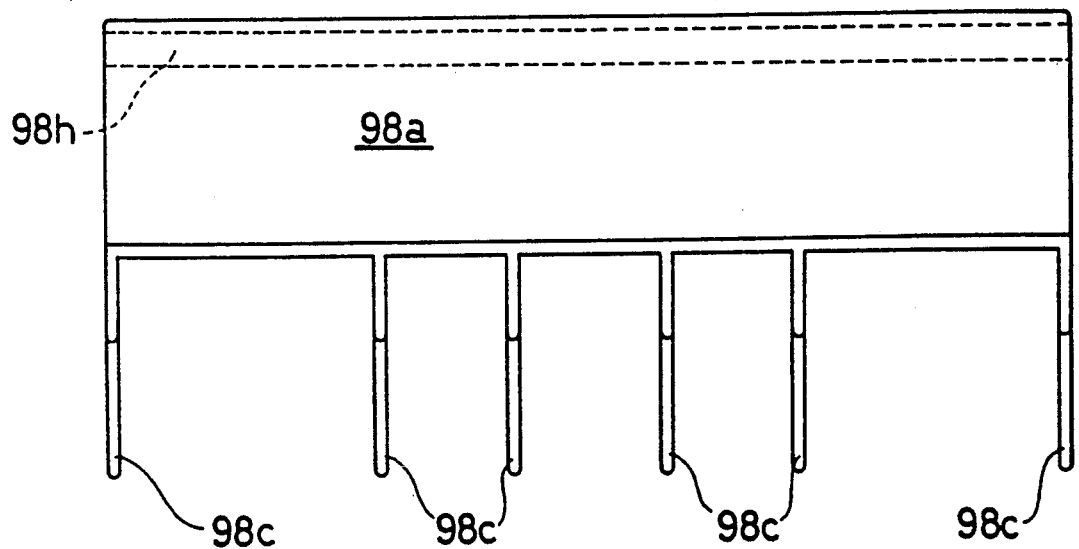
Fig. 13(b)

APPARATUS FOR ADJUSTING FASTENING POSITION OF FASTENING MEANS IN SEAT BELT DEVICE

BACKGROUND OF THE INVENTION

This invention relates to an infant-restraining protective seat having at least a seat portion for seating an infant. More particularly, the invention relates to an infant-restraining protective seat which is secured to the seat of a vehicle by fastening, within the seat portion, fastening means of a seat belt device installed in the seat of the vehicle and having at least the fastening means, such as a tongue and buckle.

In a vehicle such as an automobile or airplane, restraining protective seats for infants have been used in order to maintain the seated posture of an infant during travel and protect the infant from shock at the time of acceleration and deceleration. An infant restraining and protective seat of this kind has a reclinable seat main body reclinably attached to a base member and integrally molded to include a seat portion which seats an infant and a seat back for supporting the back of the seated infant, and an infant seat belt device for restraining the seated infant. The infant seat belt device has an infant seat belt, a chest-contact pad attached to the end of the infant seat belt, a tongue provided on the end of the chest-contact pad, and a buckle with which the tongue is engaged in a fastenable and unfastenable manner. In a state in which the tongue of the infant seat belt is engaged with and locked by the buckle, the infant seated on the seat portion is restrained by the infant seat belt and chest-contact pad.

The infant-restraining protective seat of this kind is secured to a vehicle seat by a seat belt device installed in a seat of the vehicle for the purpose of restraining a passenger seated in the seat. More specifically, the protective seat has a base portion formed to have large through-holes on the right and left. The tongue and buckle of the vehicle seat belt are passed through these holes from the left and right and are fastened within the base portion, thereby securing the protective seat to the vehicle seat.

However, depending upon the type of vehicle, there are instances where the width of the vehicle seat in which the infant-restraining protective seat is to be secured, namely the distance between the left and right side walls or left and right arm rests of the vehicle seat, is small. When an attempt is made to insert the tongue and buckle of the seat belt from the left and right of the protective seat and fasten them within the base portion of the protective seat in order to secure the protective seat in such a vehicle seat, the clearance between the left and right sides of the protective seat and the left and right side walls or left and right arm rests of the vehicle seat will be too small, thus making it extremely troublesome to insert the tongue and buckle through the through-holes of the base portion and difficult to fasten and unfasten the tongue and buckle. Accordingly, a problem which arises is that labor is required to fixedly attach the infant-restraining protective seat to the vehicle seat belt and detach it from the vehicle seat.

SUMMARY OF THE INVENTION

An object of the present invention is to provide an infant-restraining protective seat capable of being fixedly attached to and detached from a vehicle seat with ease.

According to the present invention in a first aspect thereof, the foregoing object is attained by providing an infant-restraining protective seat having at least a seat portion for seating an infant, the protective seat being secured to a seat of a vehicle by fastening, within the seat portion, fastening means of a seat belt device installed in the seat of the vehicle and having at least the fastening means, such as a tongue and buckle, characterized in that at least a portion of an upper part of the seat portion is tiltably provided so as to be capable of opening the interior of the seat portion.

In a second aspect of the invention, the infant-restraining protective seat is characterized in that the tiltable portion on the upper part of the seat portion is provided with a load transmitting portion for transmitting a load, which is applied to the tiltable portion, to a lower part of the seat portion via the load transmitting portion.

In a third aspect of the invention, the infant-restraining protective seat is characterized in that the load transmitting portion is a reinforcing rib for reinforcing the tiltable portion.

In a fourth aspect of the invention, the infant-restraining protective seat is characterized in that a lower part of the seat portion is provided with a load transmitting portion for transmitting a load, which is applied to the tiltable portion of the upper part of the seat portion, to the lower part of the seat portion via the load transmitting portion.

In the infant-restraining protective seat according to the first aspect of the present invention constructed as set forth above, at least a portion of the upper part of the seat portion is tiltably provided so as to be capable of opening the interior of the seat portion. As a result, the operation for fastening and unfastening the fastening means of the vehicle seat belt device can be performed from above the front of the protective seat. Even if the width of the vehicle seat is small, therefore, the protective seat can be secured to the vehicle seat in a simple manner.

In the infant-restraining protective seat according to the second aspect of the invention, the load applied to the tiltable portion of the seat is transmitted to lower part of the seat via the load transmitting portion. As a result, the load supported is small at the tiltable portion of the seat so that this portion need not be made that strong.

In the infant-restraining protective seat according to the third aspect of the invention, the tiltable portion of the seat is reinforced by reinforcing ribs and therefore is large in strength.

In the infant-restraining protective seat according to the fourth aspect of the invention, the load applied to the tiltable portion of the seat is transmitted to the lower part of the seat via the load transmitting portion. In this case, the tiltable portion of the seat is comparatively light in weight so that this portion, which is opened in order to fasten and unfasten the fastening means of the vehicle seat belt device, can be opened and closed with ease.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 5 ida perspective view showing a base portion in this embodiment;

FIG. 13 illustrates a cover seat, in which (a) is a side view and (b) a front view thereof;

DESCRIPTION OF THE PREFERRED EMBODIMENT

An embodiment of the present invention will now be described with reference to the drawings.

Figure 1:
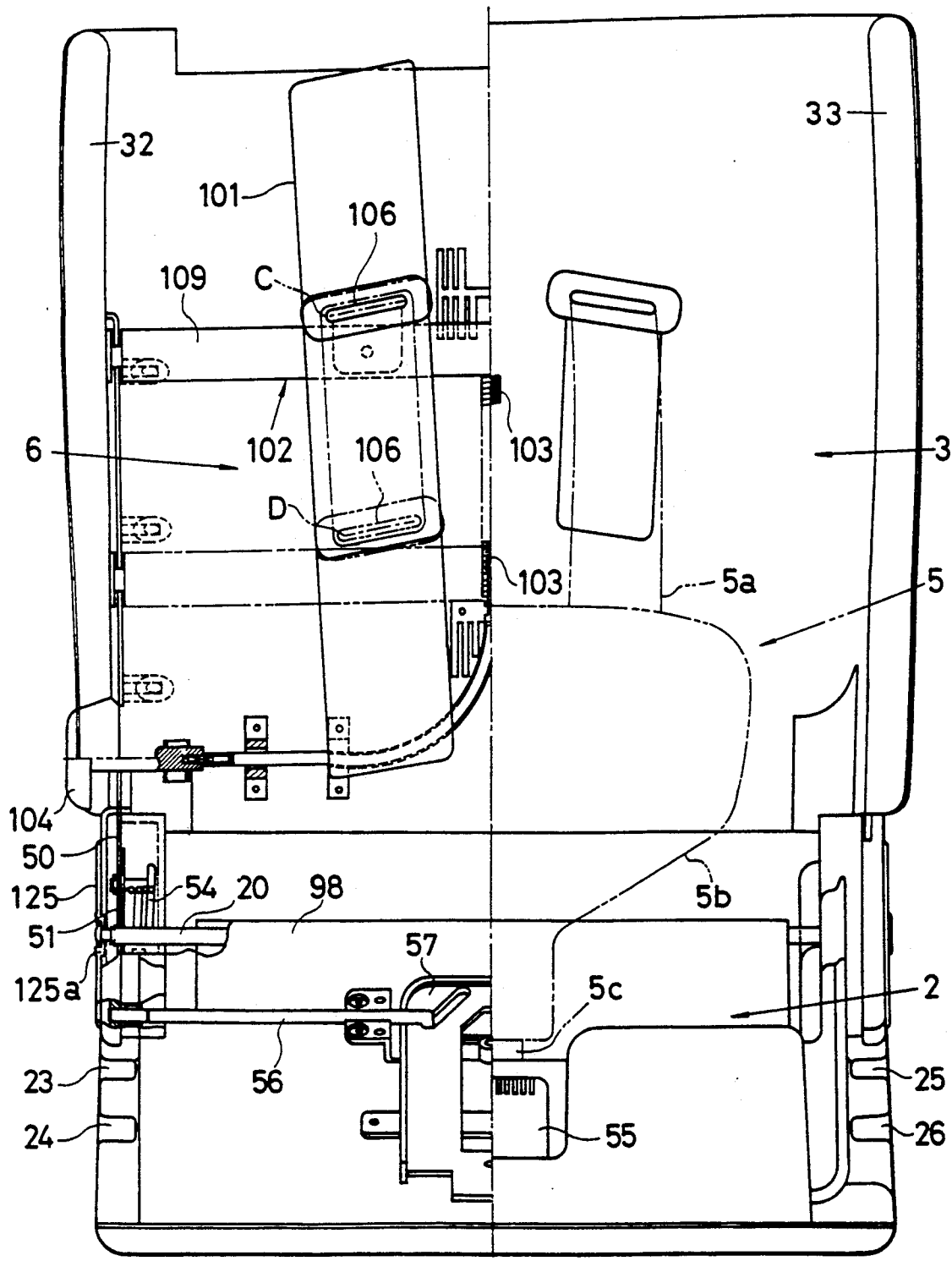
FIG. 1 is a front view showing an embodiment of an infant-restraining protective seat according to the present invention, in which the left half of the seat has been cut away.
Figure 2:
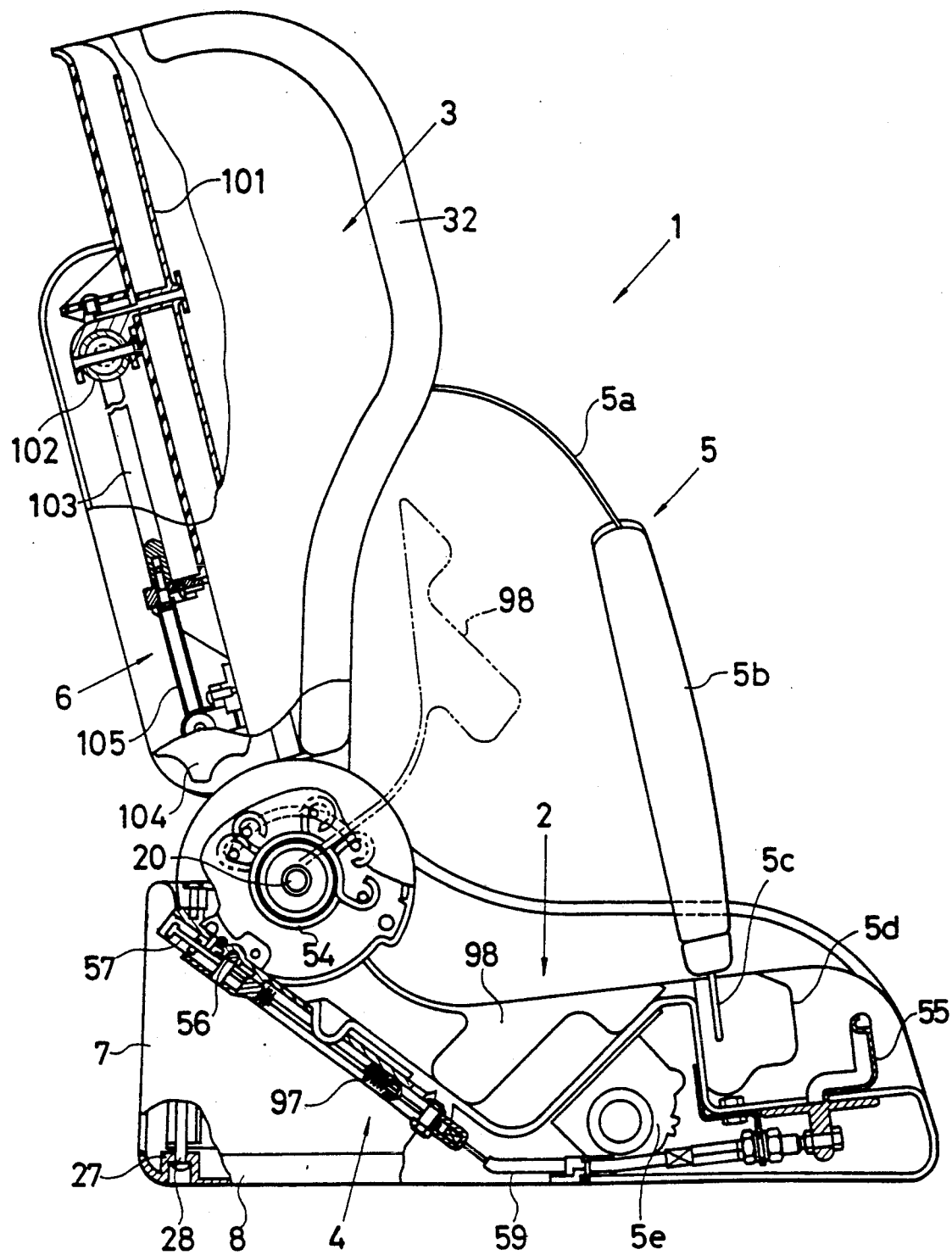
FIG. 2 is a side view showing this embodiment with a portion thereof cut away.

As illustrated in FIGS. 1 and 2, an infant-restraining protective seat 1 according to the embodiment of this invention includes a seat portion 2 for seating an infant, a seat back 3 tiltably attached to the seat portion 2 for supporting the back of the infant, a seat-back tilting control device 4 for controlling tilting of the seat back 3, an infant seat belt device 5 for restraining the infant seated on the seat portion 2, and a shoulder-belt adjusting device 6 for adjusting the up-and-down position of a shoulder belt 5a in the infant seat belt device 5.

Figure 3:
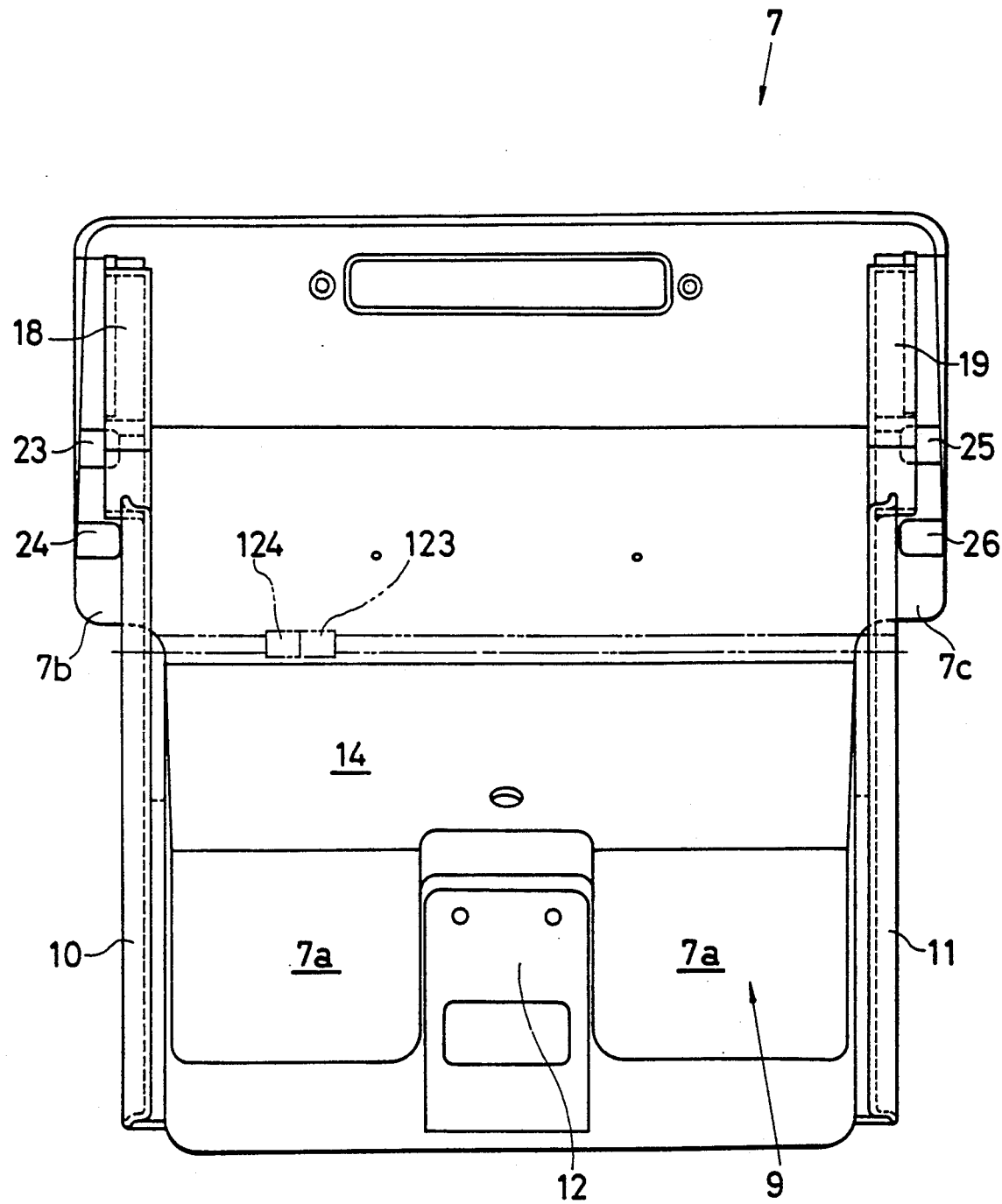
FIG. 3 is a plan view showing the main body of a seat portion, in this embodiment.
Figure 4:
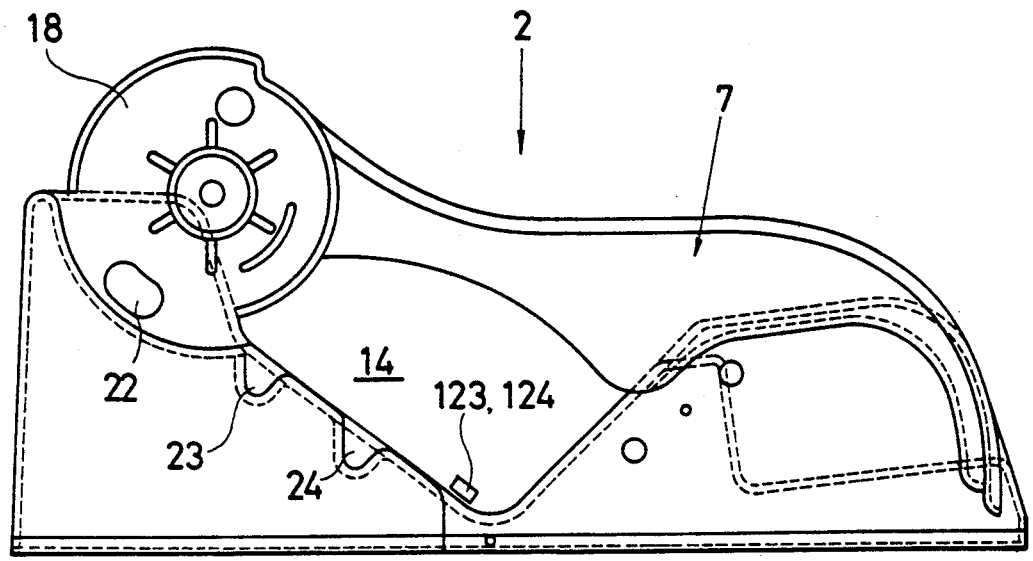
FIG. 4 is a side view showing the main body of the seat portion this embodiment.

The seat portion 2 comprises a seat-portion body 7 and a base portion 8 supporting the seat-portion body 7. As illustrated in FIGS. 3 and 4, the seat-portion body 7 is constituted by a central portion 9 which directly seats the infant, and left and right side walls 10, 11 formed respectively on the left and right sides of the central portion 9. These components are formed as a unitary body consisting of a plastic shell. Formed in the forward part of the central portion 9 is a first recess 12 for accommodating a buckle 5d of the infant seat belt device 5, described later, and an operating lever 55 of the seat-back tilting control device 4, also described later.

Formed across the middle of the central portion 9 in terms of the longitudinal direction thereof is a second recess 14 having a V-shaped cross section. The arrangement is such that a tongue 123 and buckle 124 of a passenger-restraining seat belt device installed at a vehicle seat 122 of a vehicle such as an automobile or airplane and used also for securing the infant-restraining protective seat 1 to the vehicle seat are situated within the second recess 14.

The rear portions of the left and right side walls 10, 11 are formed to have respective turning support portions 18, 19, of substantially circular shape, at which turning portions of the control device 4 are supported. The turning support portions 18, 19 are provided at their centers with a turning-shaft through-hole 21 through which a turning shaft 20 for rotatably supporting the seat back 3 is passed, and at their rearward lower portions with a locking-pin through-hole 22 through which a locking pin 56 (the details of which will be described later) of the control device 4, which pin is for locking the seat back 3 at a set predetermined angular position, is passed.

The outer sides of the left and right side walls 10, 11 are formed to have pairs of grooves 23, 24; 25, 26; respectively, having upwardly open substantially V-shaped cross sections. These grooves are situated at positions corresponding to the second recess 14. In a case where the lateral width of the protective seat 1 for infants is considerably smaller than the width of the vehicle seat to which the protective seat 1 is secured, a pair of projecting portions 120c, 120d of a belt guide 120 (shown in FIG. 15) which guides a seat belt 121 installed at the vehicle seat are supported by these grooves 23, 24, 25, 26 when the belt guide is used.

As illustrated in FIG. 5, the base portion 8 also is formed of a plastic shell and is formed to have a prescribed number of mounting holes 27 into which screws for attaching the seat-portion body are tightly screwed. As shown in FIG. 2, the seat-portion body 7 is attached to a mounting portion 27 on the base portion 8 by means of screws 28. The left and right sides of the base portion 8 are provided with a pair of respective belt-guide through-holes 29, 30 through which a turning shaft 120b of the aforesaid belt guide is passed so as to be capable of turning.

Figure 6:
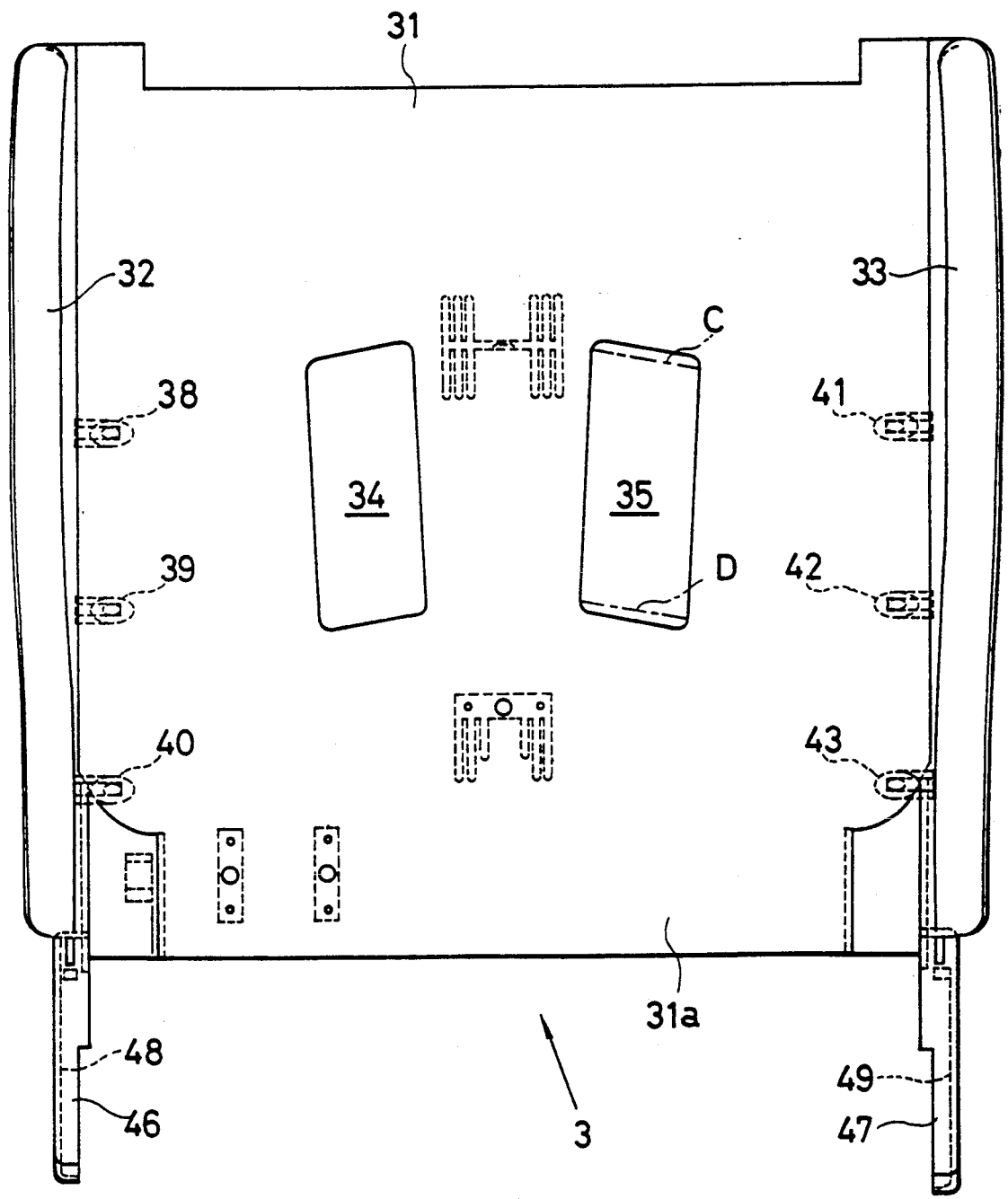
FIG. 6 is a front view showing a seat back in this embodiment.

As shown in FIG. 6, the seat back 3 is constituted by a seat back portion 31 which directly supports the back of the seated infant, and left and right side walls 32, 33 provided respectively on the right and left sides of the seat back portion 31. These also consist of a plastic shell. The central portion of the seat back 31 is provided with a pair of vertically extending guide holes 34, 35 each having the shape of parallelogram. A belt guide 101 in the shoulder-belt adjusting device 6 is passed through each of the guide holes 34, 35. The arrangement is such that the belt guide 101 may be moved up and down while being guided in the guide holes 34, 35.

The left and right side walls 32 and 33 at portions near the seat back portion 31 are provided respectively with mounting portions 38, 39, 40 and 41, 42, 43 into which screws for attaching an upper bracket 50 (shown in FIG. 7) of the seat-back tilting control device 4 are tightly screwed.

The lower ends of the left and right side walls 32, 33 are formed to have respective turning support portions 46, 47, of substantially circular shape, in which turning portions of the seat-back control device 4 are accommodated and supported. The turning support portions 46, 47 are centrally provided with respective through-holes 48, 49 into each of which a projecting portion 125a on the central portion of a rotating shaft cover 125 (shown in FIG. 1), described later, is inserted.

As illustrated in FIGS. 1 and 2, the seat-back tilting control device 4 includes left and right upper brackets 50 attached respectively to the left and right side walls 32, 33 of the seat back 3, left and right lower brackets 51 attached respectively to the left and right side walls 10, 11 of the seat-portion body 7, a torsion spring 54 interposed between an upper hook pin 52 attached to the upper bracket 50 and a lower hook pin 53 attached to the lower bracket 51, an operating lever 55, the locking pin 56, a cam plate 57 for controlling movement of the locking pin 56 between a locking position and an unlocking position, a case 58 for slidably accommodating and supporting the locking pin 56 and the cam plate 57, a biasing spring 97 for constantly biasing the cam plate 57 in such a direction that the locking pin 56 assumes the locking position, and an operating-force transmitting link 59 connected between the operating lever 55 and the cam plate 57 for transmitting the operating force of the operating lever 55 to the cam plate 57 against the biasing force of the biasing spring 97.

Figures 7A, 7B:
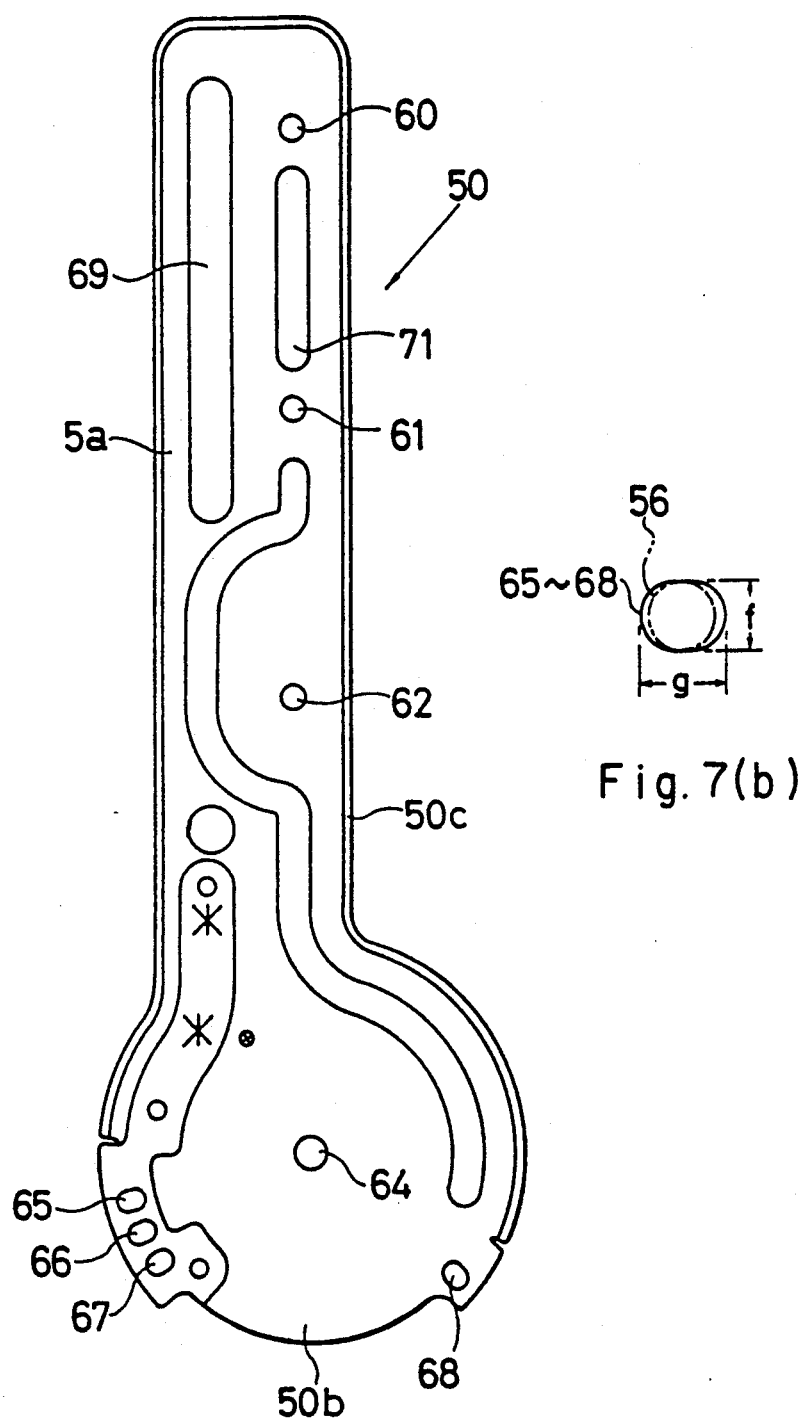
FIG. 7 illustrates an upper bracket in this embodiment, in which (a) is a plan view thereof and (b) an enlarged view of a locking hole.

As illustrated in FIG. 7, the upper bracket 50 has the shape of a flat plate and is constituted by an upper rectangular portion 50a and a lower circular portion 50b. The rectangular portion 50a is provided with three vertically aligned screw holes 60, 61, 62 through which screws for attaching the upper bracket 50 to the seat back are passed.

The circular portion 50b is provided with a hole 64 through which the turning shaft 20 is passed so as to be capable of turning relative the circular portion. Further, in order that the seat back 3 may be locked at any of three reclining angles, three locking holes 65, 66, 67 through which the locking pin 56 is passed are formed in the circular portion 50b on the circumference of a circle of a prescribed radius from the center of the hole 64. In order to lock the seat back 3 at the folded position, the circular portion 50b is provided with a locking hole 68, located on the same circumference as the locking holes 65, 66, 67, through which the locking pin 56 is passed. As shown in (b) of FIG. 7, each of the locking holes 65, 66, 67, 68 is elliptical in form, with the ellipse having a minor axis f and a major axis g. In this case, the minor axis f is set to have a size that allows the locking pin 56 to be passed through and slid along the hole with almost no gap between the pin 56 and the walls of the hole. Further, the locking holes 65, 66, 67, 68 are so arranged that the minor axis f of each hole lies in the circumferential direction of a circle concentric with the hole 64 while the major axis g of each hole lies in the diametric direction of the circle concentric with the hole 64. The circular portion 50 is further provided with a longitudinally extending guide slot 69. A guide 113 of supporting means 102 is guided up and down by the guide slot 69.

As illustrated in FIG. 1, the upper bracket 50 is secured to the seat back 3 by passing screws through the screw holes 60, 61, 62 and screwing them into the mounting holes 38, 39, 40 of the seat back 3.

Figure 8A:
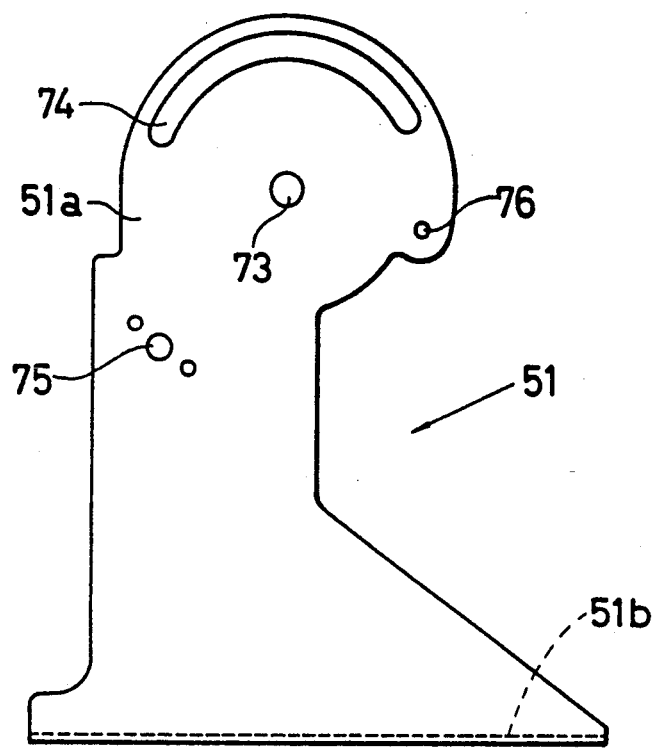
FIG. 8 illustrates a lower bracket in this embodiment in which (a) is a front view thereof and (b) a plan view.
Figure 8B:
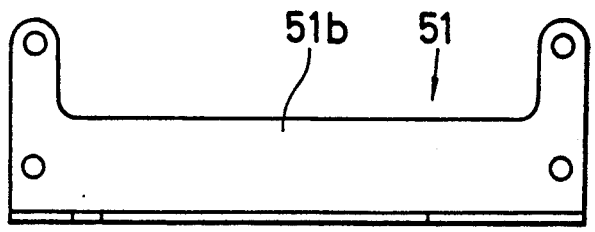

As shown in (a) and (b) of FIG. 8, the lower bracket 51 is formed to have a semicircular portion 51a on its upper part, while its lower part is formed to have a mounting portion 51b fastened to the seat-portion body 7 by screws. The semicircular portion 51a has a centrally provided circular hole 73 through which the turning shaft 20 is passed. The semicircular portion 51a is further provided with a guide slot 74 along an arc concentric with the hole 73. The upper hook pin 52 is passed through the guide slot 74 and is turnably guided thereby when the seat back 3 is tilted. The lower bracket 51 includes also a hole 75 through which the locking pin 56 is slidably passed. In this case, the through-hole 75 is provided at such a position that the length of a line between the center of the hole 75 and the center of the hole 73 will be equal to the radius of the circle, which is centered on the hole 64, on which the locking holes 65, 66, 67 of upper bracket 50 are provided. The upper bracket 50 is secured to the seat-portion body 7 by screws (not shown).

As illustrated in FIG. 1, the turning shaft 20 is passed through the hole 73 of the lower bracket 51, which is secured to the seat-portion body 7, and is supported on the lower bracket 51, and the upper bracket 50 secured to the seat back 3 is situated on the outer side of the lower bracket 51 and is tiltably supported by passing the turning shaft 20 through the hole 64. In this case, the upper bracket 50 is prevented from falling off the turning shaft 20 by a retaining ring 77. A cover 78 of the turning shaft 20 is attached so as to cover the turning shaft 20 by fitting a projection 78a of the cover 78 into the through-hole 48 of the seat back 3 and screwing a screw into the end portion of the turning shaft 20. The upper hook pin 52 secured to the upper bracket 50 is passed through the guide slot 74 so as to extend to inner side of the lower bracket 51 and is situated between the turning support portions 18, 19 of the seat-portion body 7.

In addition, the torsion spring 54 is interposed between the upper hook pin 52 and the lower hook pin 53 secured to the lower bracket 51. Thus, the seat back 3 is attached to the seat-portion body 7 so as to be capable of tilting about the turning shaft 20. In this case, one of the locking holes 65, 66, 67, 68 of the upper bracket 50 registers with the through-hole 75 of the lower bracket 51 depending upon the angular position to which the seat back 3 has been tilted.

Figures 9A, 9B:
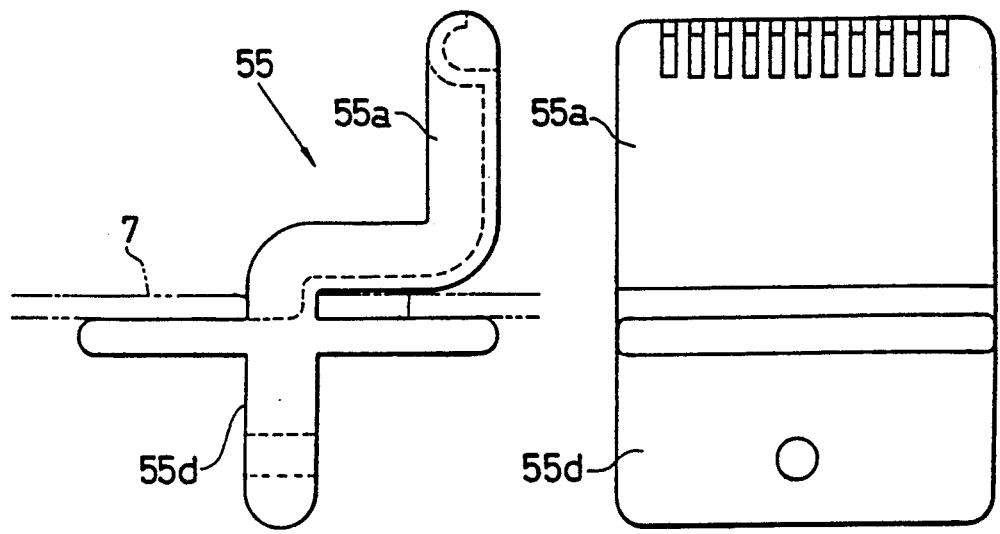
FIG. 9 illustrates an operating lever of a seat-back tilting control device in this embodiment, in which (a) is a side view thereof and (b) a front view.

As shown in FIG. 9, the operating lever 55 includes an operating portion 55a arranged in the recess 12 of the seat-portion body 17 for actuating the operating lever 55, and a connection portion 55d to which the operating-force transmitting link 59 is connected.

Figure 10:
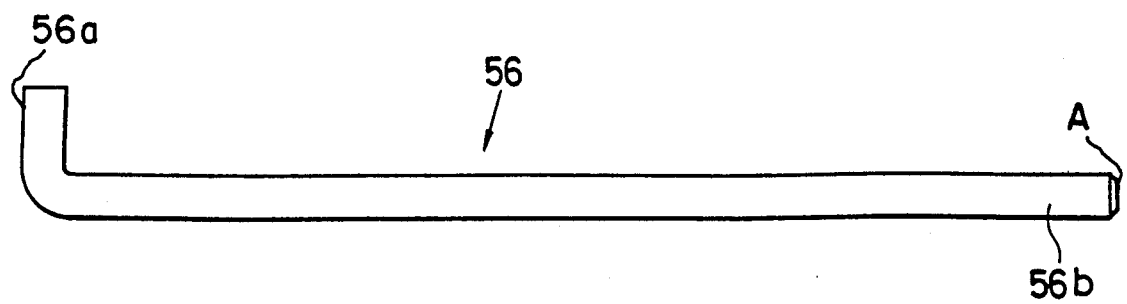
FIG. 10 is a view showing a locking pin in this embodiment.

As shown in FIG. 10, the locking pin 56 is formed from a round bar, one end of which is formed to have a cam follower 56a bent at a right angle. The cam follower 56a is fitted into cam slots 80, 81 (shown in FIG. 19) of the cam plate 57 and is moved by movement of the cam plate 57 while being guided by the cam slots 80, 81. The other end of the locking pin 56 is formed to have a locking portion 56b. Owing to movement of the locking pin 56 while it is being guided by the cam slots 80, 81, the locking portion 56b is passed through one of the locking holes 65, 66, 67, 68 of the upper bracket 50 and the through-hole 75 of the lower bracket 51 so as to lock the upper bracket 50 and the lower bracket 51. In this case, the other end of the locking pin 56 is provided with a chamfer A. The locking portion 56b is passed through the locking holes 65, 66, 67, 68 and the through-hole 75 more easily by virtue of the chamfer A.

Figure 11A:
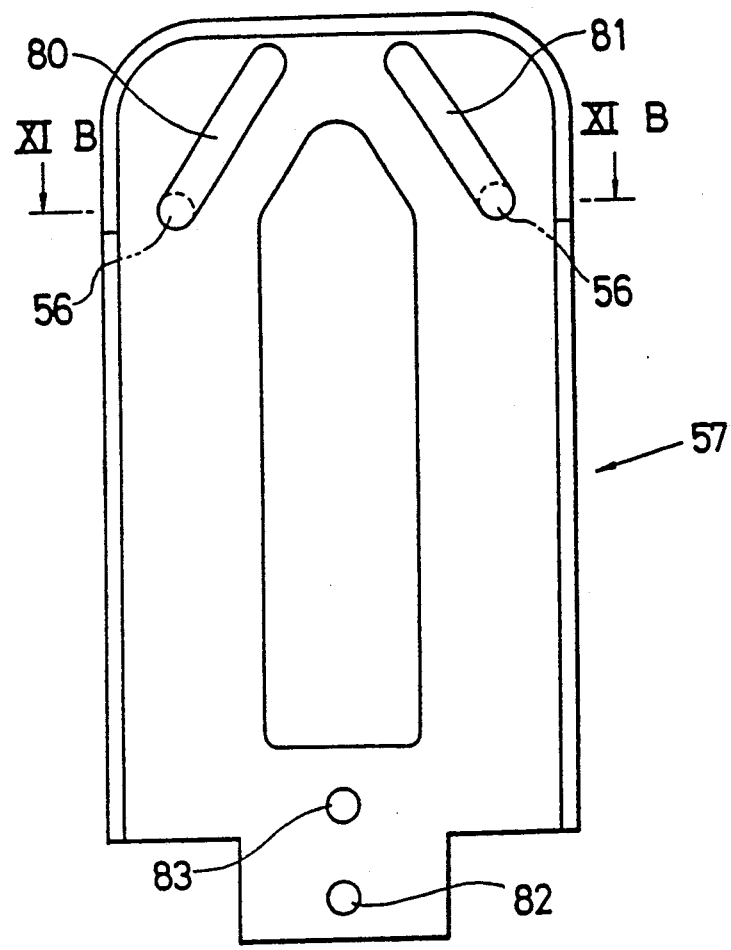
FIG. 11 illustrates a cam plate of the seat-back tilting control device in this embodiment, in which (a) is a plan view thereof and (b) a sectional view taken along line XIXB—XIXB.
Figure 11B:
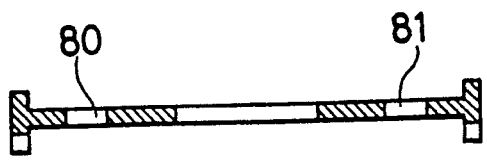

As illustrated in FIG. 11, the cam plate 57 is formed substantially as a flat plate. In cam plate 57 as it appears in FIG. 11, the upper edge is formed to have the pair of cam slots 80, 81, which diverge from each other from the top down, into which the cam follower 56a of the locking pin 56 is inserted. The lower edge of the cam plate 57 is provided with a hole 82 to which one end of the operating-force transmitting link 59 is connected, and with a hole 83 to which one end of the biasing spring 97 (shown in FIG. 2), which biases the cam plate 57 upward at all times as seen in FIG. 11, is connected.

As illustrated in FIG. 2, the operating-force transmitting link 59 has one end thereof connected to the hole 55e of the connecting portion 55d of operating lever 55. The other end of the link 59 is connected to the hole 82 of the cam plate 57.

Figure 12:
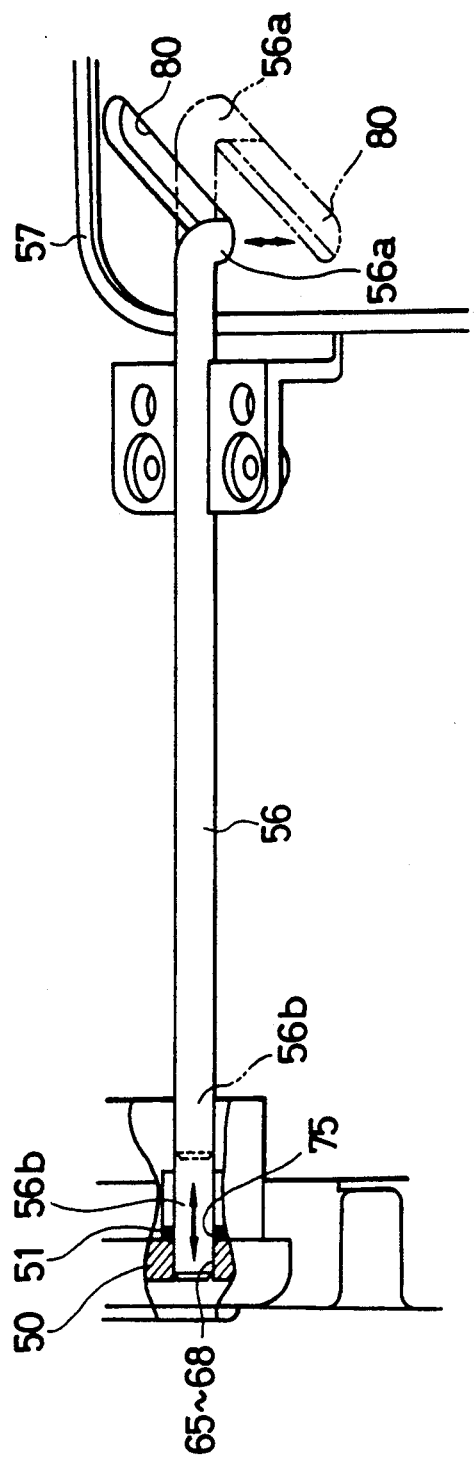
FIG. 12 is a view for describing the operation of the locking pin and cam plate in the seat-back tilting control device.

In the seat-back tilting control device 4 thus constructed, the cam follower 56a of the locking pin 56 ordinarily is set at the lowermost end of the cam slots 80, 81 by the biasing spring 97, as described above, and the locking pin 56 is projecting to the maximum degree. With the locking pin 56 in this state, as shown in FIG. 12, the locking portion 56b is fitted into any one of the locking holes 65, 66, 67, 68 and the through-hole 75. The locking pin 56 therefore is in the locking position. As a result, the seat back 3 is set at a prescribed reclining angle or in the folded position. When the cam plate 57 is moved downward in FIG. 12 by pulling the operating lever 5 forward, the cam follower 56a is guided by the cam slot 80, and therefore the locking pin 56 moves to the right. When the cam follower 56a is situated at the uppermost end of the cam slot 80, as indicated by the phantom lines, the locking portion 56b exits completely from one of the locking holes 65, 66, 67, 68 and from the through-hole 75, whereby the locking pin 56 assumes the unlocking position. As a result, the seat back 3 is free to tilt.

The infant seat belt device 5 includes left and right shoulder belts 5a, a chest-contact pad 5b connected to the shoulder belts 5a, a tongue 5c attached to the lower end of the chest-contact pad 5b, the buckle 5d with which the tongue 5c locks, and a retractor 5e for taking up a webbing, which unites the left and right shoulder belts 5a into a single body, through the back of the seat back 3. The infant seat belt device 5 is substantially identical with that of the prior art.

As depicted in FIGS. 1 and 2, a cover seat 98 is supported on the turning shaft 20, which tiltably supports the seat back 3 relative to the seat portion 2, so as to be capable of tilting between the position indicated by the solid line and the position indicated by the phantom line in FIG. 2, the cover seat 98 being situated between the left and right lower brackets 51. As illustrated in FIG. 13, the cover seat 98 has a curving main body 98a the upper surface of which defines a seat surface 98b for seating an infant. The lower surface of the main body 98a is provided with a predetermined number of reinforcing ribs 98c. The ribs 98c, which are formed to be identical in shape, have a rectangular first projection 98d and a triangular second projection 98e. The upper end of the cover seat 98 is provided with a hole 98h into which the turning shaft is loosely fitted.

The cover seat 98 is formed in such a manner that when it is at the position indicated by the solid line in FIG. 2, it will cover the second recess of the seat-portion body 7 and cooperate with the seat surface 7a at the forward part of the seat-portion body 7 and a seat back surface 31a of the seat back portion 31, which constitutes the seat back 3, to render continuous the seat surface of the protective seat 1 and the surface of the seat back. As a result, the infant can be seated safely and reliably. In this case, as illustrated in FIG. 2, a tip 98f of the first projection 98d comes into abutting contact with one inclined surface of the V-shaped second recess 14, and an oblique end 98g of the second projection 98e comes into abutting contact with the other inclined surface of the second recess 14. As a result, the weight of the seated infant is reliably supported on the seat-portion body 7 via the reinforcing ribs 98c.

Figure 14:
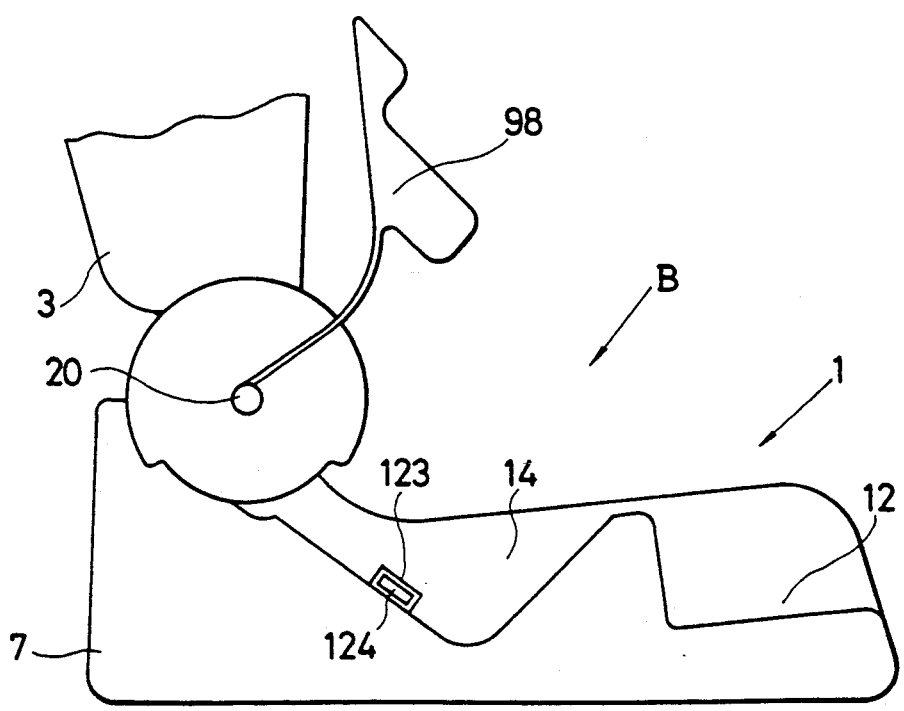
FIG. 14 is a view for describing the operation of the cover seat.

When the cover seat 98 is at the position indicated by the phantom line in FIG. 2, on the other hand, it opens the second recess 14 of the seat-portion body 7. As result, when the protective seat 1 is attached to and detached from a vehicle seat, as shown in FIG. 14, the operation for fastening and unfastening of the tongue 123 and buckle 124 of the seat belt device, which is installed at the vehicle seat and situated in the second recess 14, can be performed easily from above the front of the protective seat 1 (i.e., from the direction of arrow B). In particular, when it is difficult to secure the protective seat 1 to the vehicle seat from the sides of the vehicle seat whose width is only slightly larger than the width of the protective seat 1, as in a vehicle seat both sides of which have wings or arm rests, the operation for attaching and detaching the protective seat is greatly simplified.

Thus, the cover seat 98 constructs a tiltable portion of the upper part of the seat portion according to this invention.

The reinforcing ribs 98c may be provided on the lower part of the seat-portion body 7 forming the second recess 14, and the cover seat 98 can be constructed by the entirety of the upper part of the seat-portion main body 7.

As illustrated in FIGS. 1 and 2, the shoulder-belt adjusting device 6 includes the belt guide 101 for guiding the shoulder belts of the infant seat belt in such a manner that the position of the shoulder belts can be adjusted up or down, the supporting means 102 for supporting the belt guide 101, the vertically extending screw shaft 103 for moving the supporting means 102 up and down, the operating knob 104 turnably attached to one of the left and right side walls 32, 33 (the left side wall 33 in the example illustrated) of the seat back 3, and the torque link 105 which connects the operating knob 104 and the screw shaft 103 while producing a right-angle change in direction, and which transmits the rotational torque of the operating knob 104 to the screw shaft 103. The belt guide 101 is capable of being moved up and down in such a manner that the hole 106 through which the belt is passed is moved up and down between an upper-limit position C and a lower-limit position D.

When the operating knob 104 is turned in the shoulder-belt adjusting device 6 thus constructed, the rotational torque is transmitted to the screw shaft 103 via the torque link 105, whereby the screw shaft 103 is turned. Turning the screw shaft 103 in one direction lowers the belt guide 101, whereas turning the screw shaft 103 in the other direction raises the belt guide 101. Thus, the position of the shoulder belts of the infant seat belt device can be continuously adjusted up and down.

Figure 15:
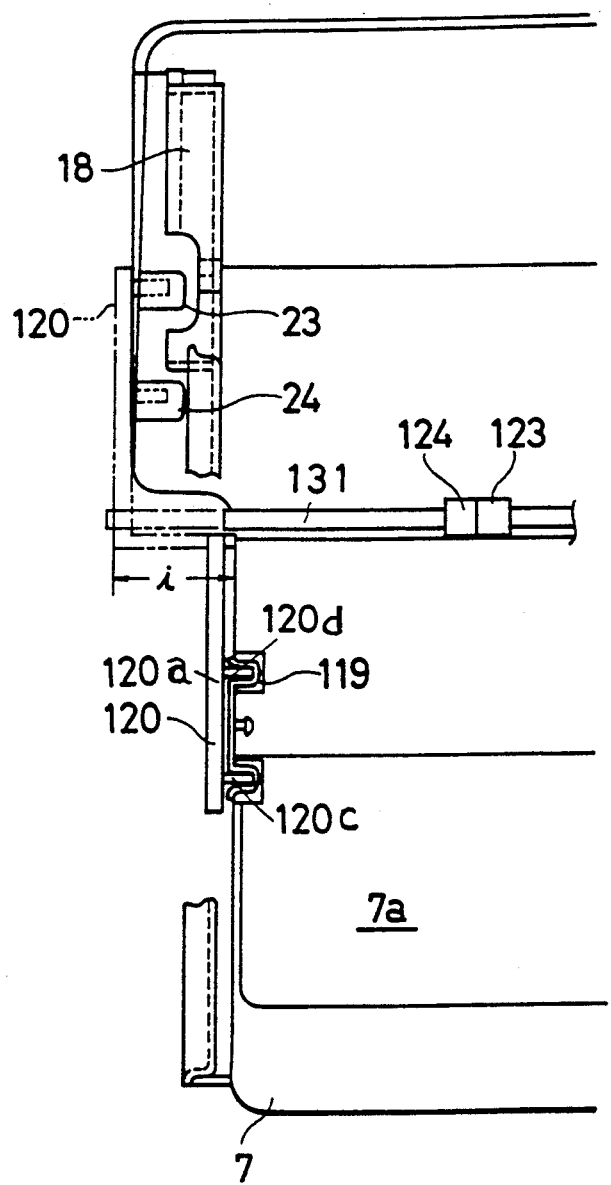
FIG. 15 is a view showing the set position of a belt guide as well as the mounting position of a retaining spring for retaining the belt guide in an embodiment of the present invention.

As illustrated in FIG. 15, a retaining spring 119 for retaining the pair of belt guides 120 is fixedly secured to the left and right side walls of the seat-portion body 7 in the vicinity of the other inclined surface of the second recess 14. The belt guide 120 is supported on the base portion 8 at a position corresponding to the lowermost part of the second recess 14 so as to be capable of turning and of moving to the left and right. The belt guide 120 comprises a guide portion 120a for guiding the seat belt 131 of the vehicle, a turning shaft 120b provided on one end of the guide portion 120a and passed through belt-guide through-holes 29, 30 (shown in FIG. 5) of the base portion 8 so as to be capable of turning and of moving axially, and two projecting portions 120c, 120d upstanding from the guide portion 120a. The pair of projecting portions are retained by the retaining spring 119 in an attachable and detachable manner.

As indicated by the solid line in FIG. 15, the belt guide 120 ordinarily is set in a state in which it is not used, namely in a state in which it is pushed into the base portion 8 to the maximum extent and retained by the retaining spring 119. For example, in a case where the width of the vehicle seat is fairly large relative to the width of the protective seat 1, the belt guide 120 is pulled out the prescribed amount and turned leftward, as indicated by the two-dot chain line, and the belt guide 120 is set at an in-use position where the projecting portions 120c, 120d fit into the respective grooves 23, 24. With the belt guide 120 in this position, the seat belt of the vehicle is guided from the left by an amount i.

In the foregoing embodiment, a case is described in which the present invention is applied to the infant-restraining protective seat 1 in which the seat back 3 is tiltably attached to the seat portion 2 by the turning shaft 20. However, the present invention is not limited to this arrangement, for the invention is applicable first of all to an infant-restraining protective seat in which the seat portion 2 and seat back 3 are integrally molded as a unitary body reclinably provided on the base portion, and to other types of infant-restraining protective seats as well.

In accordance with the infant-restraining protective seat according to the first aspect of the present invention, as evident from the foregoing description, the operation for fastening and unfastening the fastening means of the vehicle seat belt device can be performed from above the front of the protective seat. Accordingly, even if the width of the vehicle seat is small, the protective seat can be secured to the vehicle seat in a simple manner. In addition, the operation for fixedly attaching the protective seat to and detaching it from the vehicle seat is greatly facilitated.

In accordance with the second aspect of the invention, the load applied to the tiltable portion of the seat is transmitted to the lower part of the seat via the load transmitting portion. As a result, the tiltable portion of the seat can be made comparatively small.

In accordance with the third aspect of the invention, the tiltable portion of the seat is reinforced by reinforcing ribs and therefore can be made large in strength.

In accordance with the fourth aspect of the invention, the tiltable portion of the seat can be made very light in weight. As a result, this portion, which is opened in order to fasten and unfasten the fastening means of the vehicle seat belt device, can be opened and closed with ease.

As many apparently widely different embodiments of the present invention can be made without departing from the spirit and scope thereof, it is to be understood that the invention is not limited to the specific embodiments thereof except as defined in the appended claims.

What is claimed is:

1. An infant-restraining protective seat having at least a seat portion for seating an infant, said protective seat being secured to a seat of a vehicle by fastening, within said seat portion, fastening means of a seat belt device installed in the seat of the vehicle and having at least said fastening means, such as a tongue and buckle, at least a portion of an upper part of said seat portion being tiltably provided so as to be capable of opening the interior of said seat portion.

2. The protective seat according to claim 1, wherein said tiltable portion on the upper part of said seat portion is provided with a load transmitting portion for transmitting a load, which is applied to said tiltable portion, to a lower part of said seat portion via said load transmitting portion.

3. The protective seat according to claim 2, wherein said load transmitting portion is a reinforcing rib for reinforcing said tiltable portion.

4. The protective seat according to claim 1, wherein a lower part of said seat portion is provided with a load transmitting portion for transmitting a load, which is applied to said tiltable portion of the upper part of said seat portion, to the lower part of said seat portion via said load transmitting portion.

* * * * *